United States Patent [19]

Iijima et al.

[11] 4,075,655
[45] Feb. 21, 1978

[54] COMPOSITE FEEDBACK PREDICTIVE CODE COMMUNICATION SYSTEM FOR A COLOR TV SIGNAL INCLUDING A CARRIER CHROMINANCE SIGNAL

[75] Inventors: Yukihiko Iijima; Kazumoto Iinuma; Tatsuo Ishiguro, all of Tokyo, Japan

[73] Assignee: Nippon Electric Co., Ltd., Tokyo, Japan

[21] Appl. No.: 673,327

[22] Filed: Apr. 5, 1976

[30] Foreign Application Priority Data

Apr. 3, 1975   Japan .................................. 50-40619
Nov. 19, 1975  Japan .................................. 50-139024

[51] Int. Cl.² ............................................ H04N 9/32
[52] U.S. Cl. .................................... 358/13; 325/38 B
[58] Field of Search ............. 358/12, 13; 178/DIG. 3; 179/15 BW, 15, 55 R; 325/41, 42, 38 B; 332/11; 340/327 AD

[56] References Cited
U.S. PATENT DOCUMENTS

| | | | |
|---|---|---|---|
| 3,769,451 | 10/1973 | Connor | 178/DIG. 3 |
| 3,813,485 | 5/1974 | Arps | 178/DIG. 3 |
| 3,825,831 | 7/1974 | Ishiguro | 325/38 B |
| 3,843,940 | 10/1974 | Ishiguro et al. | 325/38 B X |
| 3,921,204 | 11/1975 | Thompson | 178/DIG. 3 |

*Primary Examiner*—Robert L. Griffin
*Assistant Examiner*—Mitchell Saffian
*Attorney, Agent, or Firm*—Sughrue, Rothwell, Mion, Zinn, and Macpeak

[57] ABSTRACT

Responsive to signal samples of a color television signal including a carrier chrominance signal, a predictive encoder produces quantized prediction error signals in compliance with a first transfer characteristic $(1 - P_1)(1 - P_2)$, wherein minima which are substantially equal to zero are taken by the absolute value of $1 - P_1$ in the neighborhood of frame frequency and by the absolute value of $1 - P_2$ in the neighborhoods of zero frequency and subcarrier frequency. Responsive to the quantized prediction error signals, a predictive decoder produces reproduced samples in compliance with a second transfer characteristic of the inverse of the first transfer characteristic.

36 Claims, 14 Drawing Figures

COMPOSITE FEEDBACK PREDICTIVE CODE COMMUNICATION SYSTEM FOR A COLOR TV SIGNAL INCLUDING A CARRIER CHROMINANCE SIGNAL

BACKGROUND OF THE INVENTION

This invention relates to a composite feedback predictive code communication system for a color television signal including a carrier chrominance signal component. More particularly, this invention relates to a predictive encoder and a predictive decoder for use in a code communication system of the type described.

For code transmission of a television signal, an interframe predictive code communication system is already known wherein interframe or previous-frame feedback is resorted to on producing prediction error signals by using samples of a previous frame as predicted samples in view of the interframe correlation of the television signal. The interframe predictive code communication system is effective for a television signal for a slowly moving object. For raising the efficiency of the code transmission, a composite feedback predictive code communication system is also known wherein use is made of the interframe prediction and of intraframe prediction which may be either intersample or previous-sample feedback or interline or previous-line feedback or both. A conventional composite feedback predictive code communication system is effective for a monochrome television signal because encoding is carried out with the interframe redundancy removed by the interframe prediction and with the intraframe redundancy avoided by the intraframe prediction.

The present-day color television signals, such as NTSO, SECAM, and PAL signals, are in a form of a frequency-multiplexed color television signal comprising a luminance signal component and a carrier chrominance signal component. The latter component is produced by modulating a subcarrier by chrominance signals. For the subcarrier frequency, it is usual to select a frequency equal to an odd integral multiple of a half of the line frequency and consequently an odd integral multiple of a half of the frame frequency in order to reduce the undesirable degradation which would otherwise be introduced into the quality of the reproduced picture by interference between the luminance and the carrier chrominance signal components. The subcarrier therefore has a reversed phase during scan of the next succeeding line and also of the next succeeding frame. As will later be described more in detail, this inevitably amplifies the carrier chrominance signal components in the previous-line and previous-frame feedback prediction error signals by a factor of about two and makes it impossible to apply the interframe predictive and the composite feedback predictive code transmission directly to the frequency-multiplexed color television signals. The practice has therefore been to demodulate a frequency-multiplexed color television signal to baseband signals, such as the luminance signal Y and the chrominance signals I and Q in the case of an NTSC signal, to produce a plurality of predictive encoded signals by separately applying composite feedback predictive encoding to the respective baseband signals, and to multiplex the predictive encoded signals for transmission to a receiver or receivers. This renders it possible to make the best use of the salient features of composite feedback predictive encoding. It is, however, thereby unavoidable that the communication system is complicated, that the picture quality is degraded during demodulation and re-modulation, and that the communication system loses the compatibility to the monochrome television signals.

SUMMARY OF THE INVENTION

It is therefore an object of the present invention to provide a composite feedback predictive code communication system directly applicable to a color television signal including a carrier chrominance signal component and compatible to monochrome television signals.

It is another object of this invention to provide a composite feedback predictive code communication system of the type described and of the approximately same scale as a conventional composite feedback predictive code communication system, wherein both interframe and intraframe feedback is resorted to.

It is still another object of this invention to provide a composite feedback predictive code communication system of the type described and of the approximately same scale as a conventional composite feedback predictive code communication system, wherein samples of a previous frame, samples of a line from one to several lines previous to a line in question, and previous samples along the line in question are used as predicted samples.

It is a further object of this invention to provide a composite feedback predictive code communication system of the type described, operable at a sub-Nyquinst sampling frequency which is lower than the Nyquist frequency (twice the bandwidth in terms of frequency of the signal to be encoded) and is capable of raising the compression ratio of the predictive encoded signals.

It is a still further object of this invention to provide a composite feedback predictive code communication system of the type described, switchable among a plurality of operational modes so as to make it possible to adjust the rate of production of the codes transmitted to a receiver or receivers.

A composite feedback predictive code communication system according to this invention is for a color television signal including a carrier chrominance signal component and comprises a transmitter and a receiver. The tranmitter coprises, in turn, sampling means responsive to the television signal for producing signal samples and predictive quantizing means responsive to the signal samples for producing quantized prediction error signals in compliance with a first overall transfer characteristic given by a product of a first difference $1 - P_1$ between unity and a first transfer function $P_1$ of frequencies and a second difference $1 - P_2$ between unity and a second transfer function $P_2$ of frequencies. Minima which are sufficiently smaller than unity are taken by absolute value of the first difference at least in the neighborhood of an integral multiple (including unity) of frame frequency of the television signal and by absolute value of the second difference at least in the neighborhoods of zero frequency and of subcarrier frequency for the carrier chrominance signal component. The transmitter further comprises code transmission means responsive to the quantized prediction error signals for transmitting predictive encoded signals to the receiver. The receiver comprises code reception means responsive to the predictive encoded signals for producing reproduced prediction error signals, predictive decoding means responsive to the reproduced prediction error signals for producing reproduced samples in compliance with a second overall transfer characteristic which is an inverse of the first overall predictive characteristic, and desampling means responsive to the reproduced samples for producing a reproduction of the television signal.

BRIEF DESCRIPTION OF THE DRAWING

FIG. 7 block diagram of a composite feedback predictive code communication system according to a third embodiment of this invention;

DESCRIPTION OF THE PREFERRED EMBODIMENTS

Before describing several preferred embodiments of the present invention with reference to the accompanying drawings, composite feedback predictive encoding of a frequency-multiplexed color television signal will be described in order to facilitate understanding of this invention. Although reference is had to an NTSC color television signal, it is obvious from the following description that this invention is equally well applicable to other color television signals of a type which comprises a luminance signal component and a carrier chrominance signal component.

In an NTSC color television signal, the subcarrier frequency $f_c$ and the frame frequency $f_f$ are:

$$f_c = 455 f_h/2$$

and
Ti $f_h = 525 f_f$ where $f_h$ represents the line frequency. The phase of the subcarrier is therefore reversed in adjacent lines and also in adjacent frames as pointed out in the preamble of the instant specification. Let the luminance signal and the I and Q chrominance signals be represented by $y(t)$, $i(t)$, and $q(t)$. An NTSC color television signal $x(t)$ during scan of a frame and $x(t + T_f)$ during scan of the next succeeding frame are:

$$x(t) = y(t) + i(t)\cdot\cos(2\pi f_c t + 33°) = q(t)\cdot\cos(2\pi f_c t + 33°) \quad (1)$$

and $$x(t + T_f) = y(t + T_f) - i(t + T_f)\cdot\cos(2\pi f_c t + 33°) - q(t + T_f)\cdot\cos(2\pi f_c t + 33°), \quad (2)$$

where $T_f$ represents a frame period, namely, $1/f_f$. Unless the picture being televised discontinuously varies during scan of two adjacent frames, the signals $y(t)$, $i(t)$, and $q(t)$ are nearly equal to the signals $y(t + T_f)$, $i(t + T_f)$, and $q(t + T_f)$. Similar analysis applies to the NTSC signals for two adjacent lines. Let it be assumed for simplicity of description that an object being televised stands still without any change in color for a while. Under the circumstances, the previous-frame feedback prediction error signal should be zero. The signal pairs $y(t)$ and $y(t + T_f)$, $i(t)$ and $i(t + T_f)$, and $q(t)$ and $q(t + T_f)$ may be represented by Y, I, and Q. From Equations (1) and (2), the previous-frame feedback prediction error signal $e(t)$ is not zero but:

$$e(t) = x(t) - x(t + T_f) = 2I\cos(2\pi f_c t + 33°) + 2Q\sin(2\pi f_c t + 33°). \quad (3)$$

The carrier chrominance signal component is thus amplified by a factor of two in the previous-frame and the previous-line feedback prediction error signals. This makes it impossible to apply the interframe predictive and the composite feedback predictive code transmission directly to a frequency-multiplexed color television signal as also pointed out in the preamble. Incidentally, it is known in the art that the energy of the carrier chrominance signal component is concentrated in the neighborhoods of odd integral multiples of a half of the subcarrier frequency $f_c$.

Figure 1:
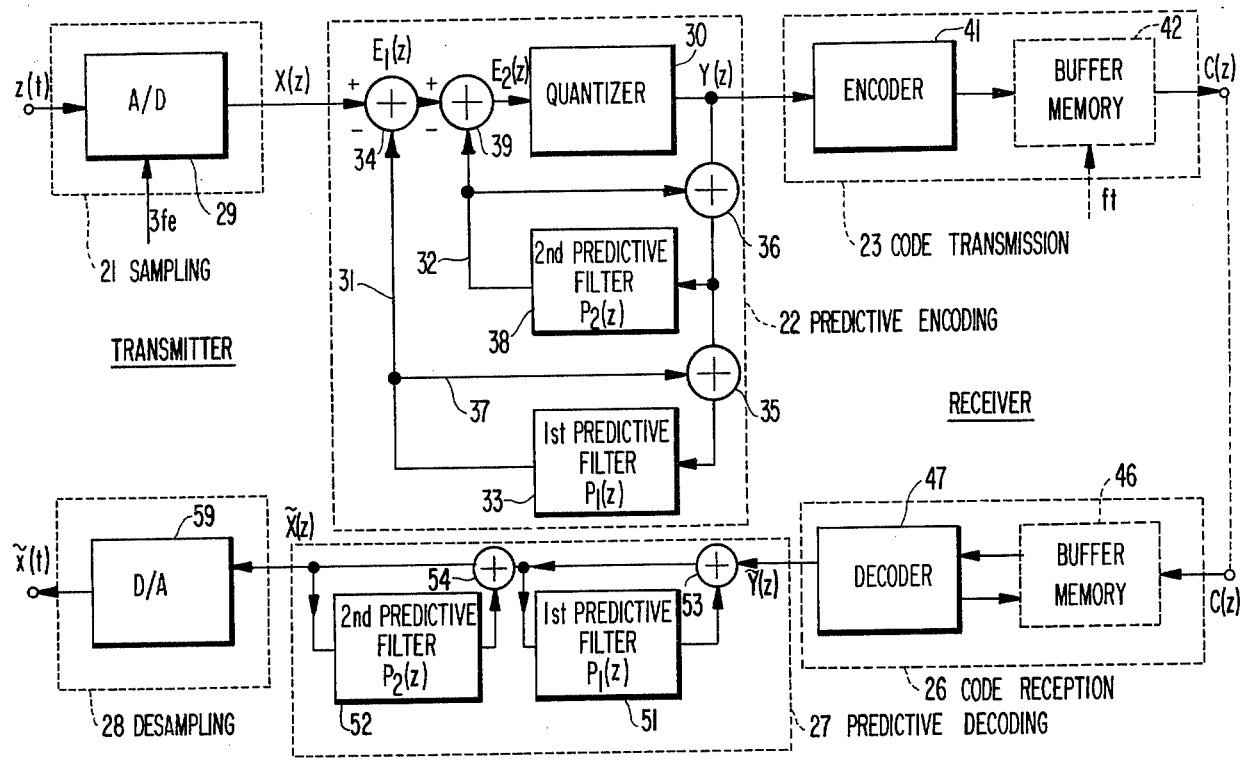
FIG. 1 is a block diagram of a composite feedback predictive code communication system according to a first embodiment of the instant invention.

Referring now to FIG. 1, a composite feedback predictive code communication system according to a first embodiment of this invention comprises a transmitter and a receiver coupled by a transmission line which is depicted with a dashed line and may be a radio channel. The transmitter comprises a sampling device 21, a predictive encoder 22, and a code transmission device 23. The receiver comprises a code reception device 26, a predictive decoder 27, and a desampling device 28. In the following description of the encoder 22 and the decoder 27, use will be made of z transformation of the sample series, where z represents $e^{j\omega}/f$, $\omega$ being the angular frequency and $f$ being the sampling frequency. As regards the details of the z transformation technique, reference should be had to J. R. Ragazzini et al., *Sampled-Data Control Systems*, McGraw-Hill, particularly pages 52–85.

According to the first embodiment, the sampling device 21 comprises an analog-to-digital converter 29 responsive to sampling pulses of a sampling frequency $f_n$ equal to approximately three times the subcarrier frequency $3f_c$ for converting an NTSC color television signal $x(t)$ into a series of successive digital signal samples X(z). The encoder 22 comprises a quantizer 30 responsive to input prediction error signals to be presently described for producing quantized prediction error signals Y(z), a first predictive path 31 responsive to the signal samples X(z) and the quantized prediction error signals Y(z) for producing first prediction error signals E₁(z), and a second predictive path 32 responsive to the first prediction error signals E₁(z) and the quantized prediction error signals Y(z) for producing second prediction error signals E₂(z) as the above-mentioned input prediction error signals. The predictive paths 31 and 32 are thus portions of a first and a second feedback loop. The first predictive or feedback path 31 comprises, in turn, a first predictive filter 33, a first substractor 34, a first adder 35, and a second adder 36 connected as shown, further comprising a local feedback path 37 for the first predictive filter 33. In addition to the second adder 36, the second predictive or feedback path 32 comprises a second predictive filter 38 and a second subtractor 39 connected as shown with another local feedback path used for the second predictive filter 38. Although not individually depicted, the sampling pulses are supplied also to the quantizer 30 and the predictive filters 33 and 38.

Let the first and the second predictive filters 33 and 38 have first and second transfer functions $P_1(z)$ and $P_2(z)$. The first and the second prediction error signals $E_1(z)$ and $E_2(z)$ are:

$$E_1(z) = [1 - P_1(z)]X(z) - P_1(z)N(z) \qquad (4)$$

and $$E_2(z) = [1 - P_2(z)]E_1(z) - P_2(z)N(z) = [1 - P_1(z)][1 - P_2(z)]X(z) - [P_1(z) + P_2(z) - P_1(z)P_2(z)]N(z), \qquad (5)$$

where N(z) represents the quantization error or noise. As will readily be understood from Equation (4), the first prediction error signal E₁(z) consists of a first component representative of the prediction error between an actual sample X(z) and a sample predicted therefor by the first predictive filter 33 and a second component representative of the feedback quantization noise. Similarly, the second prediction error signals E₂(z) consists of a first component representative of the prediction error between an actual first prediction error signal E₁(z) and a signal predicted therefor by the second predictive filter 38 and a second component representative of the feedback quantization noise. Let it be further presumed for a short while that the first transfer function P₁(z) could enable effective prediction to be carried out even for the carrier chrominance signal component, as by rejecting the frequency band near the subcarrier frequency $f_c$, so that the component in question is sufficiently suppressed in the first prediction error signal E₁(z). It is then possible by using a one-frame delay element as the second predictive filter 38 to subject an NTSC signal directly to composite feedback predictive encoding of a certain type. The second predictive filter 38 may provide a delay of a predetermined integral multiple of the frame period $T_f$. Furthermore, it is obvious from the latter half of Equation (5) that the same input prediction error signals E₂(z) are derived even with the transfer functions interchanged between the predictive filters 33 and 38. For convenience of further description, let the first predictive filter 33 give a one-frame delay.

According to a Japanese technical paper, Densi Tusin Gakkai Tusin-hosiki Kenkyukai Siryo CS73-44 (Papers for Communication System Study Committee of the Institute of Electronics and Communication Engineers of Japan, No. CS73-44), contributed by Yukihiko Iijima and Tatsuo Ishiguro, two of the present joint inventors, under the title of "NTSC Kara Terebi Singo no DPCM (DPCM for NTSC color television signals)" in July, 1973, a predictive filter capable of carrying out effective prediction even for the carrier chrominance signal component of an NTSC color television signal should have a transfer function given by a formula:

$$0.5z^{-1} + \theta z^{-3} - 0.5\theta z^{-4} \qquad (6)$$

(where $0 < \theta \leq 1$) when the sampling frequency is about three times the subcarrier frequency $3f_c$. Under the circumstances mentioned in the last part of the next preceding paragraph, the first prediction error signals E₁(z) is approximately representative of Equation (3). According to the first half of Equation (5), the first prediction error signals E₁(z) are multiplied by a factor $1 - P_2(z)$. When the second transfer function $P_2(z)$ is given by Formula (6), the factor in question is:

$$1 - P_2(z) = (1 - 0.5z^{-1})(1 - \theta z^{-3}),$$

from which it is seen that the absolute value of the factor 1—P₂(z) should take those minima at zero frequency and at one-third of the sampling frequency $f_n$, namely, at about the subcarrier frequency $f_c$, which are approximately equal to zero or sufficiently smaller than unity. This suppresses the approximately zero-frequency and subcarrier-frequency components of the first prediction error signals E₁(z) to prevent the low-frequency component of the luminance signal and the carrier chrominance signal component from appearing in the second prediction error signals E₂(z). Inasmuch as the quantized prediction error signal Y(z) is given by a sum of the second prediction error signal E₂(z) and the quantization noise N(z) therefor, an equation:

$$Y(z) = [1 - P_1(z)][1 - P_2(z)][X(z) + N(z)]$$

results from the latter half of Equation (5). It is now understood that the predictive encoder 22 should produce, in response to signal samples X(z), quantized predictifon error signals Y(z) in compliance with a first overall transfer characteristic defined by a product of a first difference $1 - P_1(z)$ between unity and the first transfer function $P_1(z)$ and a second difference $1 - P_2(z)$ between unity and the second transfer function $P_2(z)$, wherein the absolute value of the first difference $1 - P_1(z)$ at least in the neighborhood of the frame frequency $f_f$ and the absolute value of the second difference $1 - P_2(z)$ at least in the neighborhoods of zero frequency and of the subcarrier frequency $f_c$ are minima which are sufficiently smaller than unity. As will later be appreciated from other embodiments of this invention, this holds true even when the sampling frequency is not equal to about three times the subcarrier frequency $3f_c$ and even when the second transfer function $P_2(z)$ is not given by Equation (6).

The code transmission device 23 comprises an encoder 41 for converting the quantized prediction error signals Y(z) to predictive encoded signals C(z) adapted to transmission to the receiver. Inasmuch as the quantized prediction error signals Y(z) have a very large mathematical probability at the zero quantization level, it is posslbe to reduce the number of bits to be transmitted to the receiver by furnishing the encoder 41 with a conversion characteristic corresponding to the distribution of probability of the levels of the quantized prediction error signals Y(z). The code transmission device 23 may further comprise a first buffer memory 42 known in the art for temporarily storing the predictive encoded signals $C(z)$ for transmission in response to a timing signal that specifies a transmission rate $f_t$.

Further referring to FIG. 1, the code reception device 26 of the receiver comprises a second buffer memory 46 when use is made in the transmitter of the first buffer memory 42. Responsive to the predictive encoded signals $C(z)$, a decoder 47 reproduces prediction error signals $\tilde{Y}(z)$ which correspond to the quantized prediction error signals $Y(z)$ produced at the transmitter. The decoder 47 controls read out of the predictive encoded signals $C(z)$ from the second buffer memory 46 when use is made thereof. In order to reproduce those signal samples $\tilde{X}(z)$ in response to the reproduced prediction error signals $\tilde{Y}(z)$ which correspond to the digital signal samples $X(z)$, the predictive decoder 27 should have a second overall transfer characteristic $W(z)$ that is defined by:

$$W(z) = 1/[(1 - P_1(z))(1 - P_2(z))],$$

namely, that is the inverse of the first overall transfer characteristic $[1 - P_1(z)][1 - P_2(z)]$ of the predictive encoder 22. The predictive decoder 27 comprises a first predictive filter 51 having a transfer function equal to one of the first and second transfer functions $P_1(z)$ and $P_2(z)$ and a second predictive filter 52 of a transfer function equal to the other of the transfer functions $P_1(z)$ and $P_2(z)$. A first adder 53 calculates a sum of a signal produced by the first predictive filter 51 and each reproduced prediction error signal $\tilde{Y}(z)$ to supply a first sum signal representative of the sum back to the first predictive filter 51. Similarly, a second adder 54 produces a second sum signal of the first sum signal and a signal derived from he second pedictive filter 52 to supply the second sum signal back to the second predictive filter 52. The second sum signals are the reproduced signal samples $\tilde{X}(z)$ given by:

$$\tilde{X}(z) = W(z)\tilde{Y}(z) = X(z) + N(z).$$

The desampling device 28 comprises a digital-to-analog converter 59 responsive to the reproduced signal samples $\tilde{x}(z)$ for producing or replica of the television signal $\tilde{x}(t)$.

In connection with the above, it should be noted that the predictive encoder 22 may not necessarily comprise two predictive paths 31 and 32 but a single predictive path having an overall transfer characteristic defined by a product of the first and the second differences. Likewise, the predictive decoder 27 is not restricted to a two-stage recursive digital filter. It is possible to further raise the efficiency of encoding by adopting conditioned picture element conversion only to that part of the object which is moving or either by controlling the sampling rate or repeating the field for very rapidly moving objects.

Figure 2:
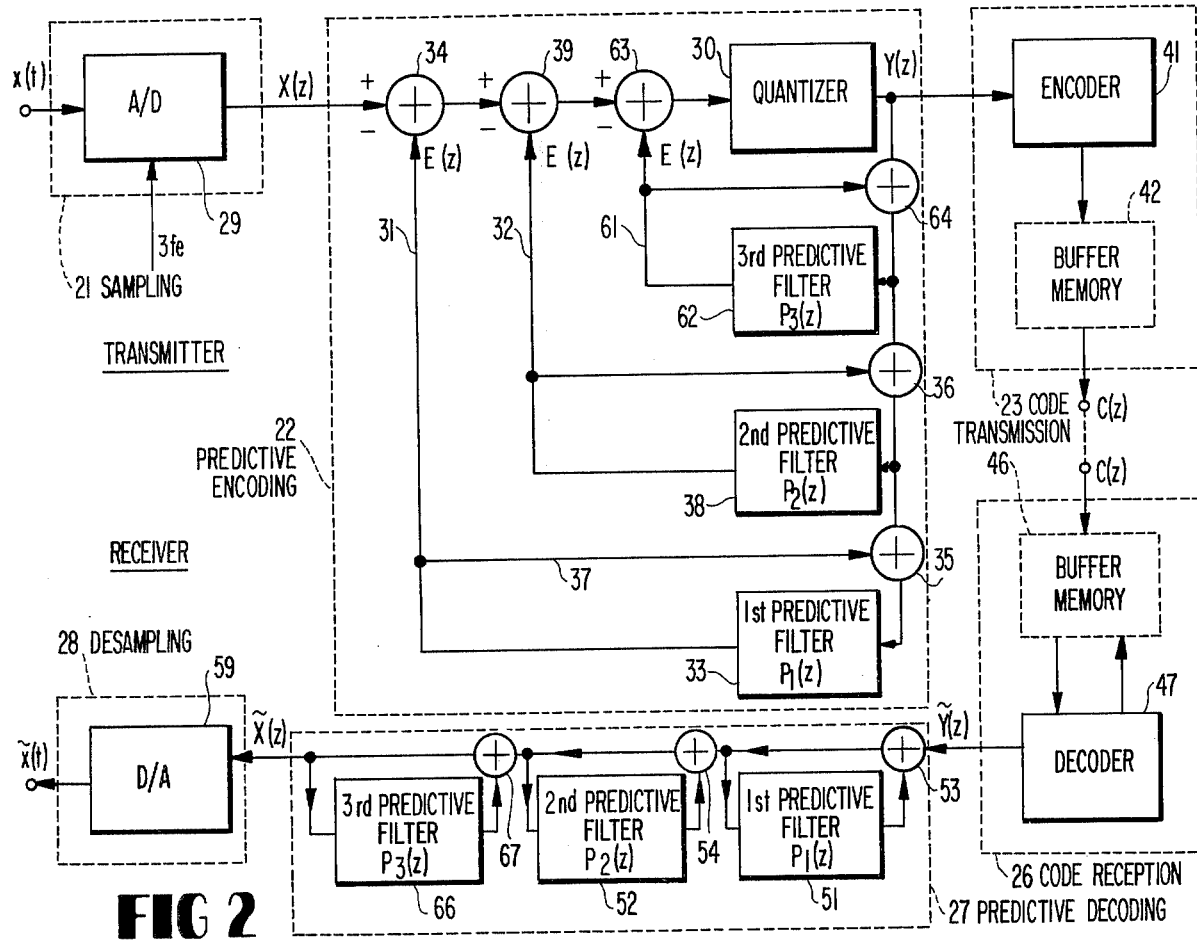
FIG. 2 is a block diagram of a composite feedback predictive code communication system according to a second embodiment of this invention.

Turning to FIG. 2, a composite feedback predictive code communication system according to a second embodiment of this invention comprises a transmitter of a similar structure as that for a code communication system according to the first embodiment. The sampling frequency $f_n$ is selected to be equal to an integral multiple of the line frequency $f_h$ in a frequency range of from two to three times the signal bandwidth. In addition to the elements which are illustrated with reference to FIG. 1 and are not necessarily identical in all respects with the elements described as will soon appear, the predictive encoder 22 comprises a third predictive path 61 comprising, in turn, a third predictive filter 62 having a third transfer function $P_3(z)$, a third subtractor 63, and a third adder 64 connected as shown with a third local feedback path used for the third predictive filter 62. Third prediction error signals $E_3(z)$ produced by the third subtractor 63 are supplied to the quantizer 30 as the input prediction error signals. The third adder 64 is included also in the first and the second predictive paths 31 and 32. As in the first embodiment, the first predictive filter 33 is a one-frame delay element. In accordance with the second embodiment, the second predictive path 32 described in conjunction with the first embodiment is divided into the second and the third predictive paths 32 and 61. More particularly, the second predictive path 32 provides the second difference $1 - P_2(z)$ whose absolute value takes minima sufficiently smaller than unity at least in the neighborhoods of odd integral multiples of a half of the line frequency. As has already been described, the first prediction error signals $E_1(z)$ essentially consit of the carrier chrominance signal component given by Equation (3) when the object being televised stands substantially still without any change in color. When the movement of the object is not negligible, the first prediction error signals $E_1(z)$ further comprise the interframe prediction error signals. In any event, the carrier chrominance signal component is suppressed in the second prediction error signals $E_2(z)$. It is therefore possible to apply predictive encoding to the latter signals $E_2(z)$ as in monochrome television signals. In other words, the third predictive path 61 may carry out previous-sample feedback and provide a third difference $1 - P_3(z)$ whose absolute value takes a minimum sufficiently smaller than unity at least in the neighborhood of zero frequency. This renders large the methematical probability that the third prediction error signals $E_3(z)$ are of zero level. The absolute value of the third difference $1 - P_3(z)$ may preferably take another minimum in the neighborhood of the subcarrier frequency $f_c$ so as to further suppress the small carrier chrominance signal component remaining in the second prediction error signals $E_2(z)$. The first overall transfer characteristic of this encoder 22 is $[1 - P_1(z)] \times [1 - P_2(z)][1 - P_3(z)]$, where the product of the latter two factors is equal to the second difference $1 - P_2(z)$ described in conjunction with the first embodiment.

Further referring to FIG. 2, the predictive decoder 27 of a code communication system according to the second embodiment comprises a third predictive filter 66 and a third adder 67 in addition to the elements illustrated with reference to FIG. 1. The second and the third predictive filters 52 and 66 have the equal transfer functions as the corresponding filters 38 and 62 used in the transmitter of a code communication system according to the second embodiment.

In connection with the first and the second embodiments, it may be mentioned here that the first predictive filter 33 may merely be a shift register or a memory element for realizing a one-frame delay, namely, a delay of F sample periods given by:

$$F = f_n/f_p$$

so that the first transfer function $P_1(z)$ may be given by $z^{-F}$. The first difference $1 - P_1(z)$ is given by $1 - z^{-F}$ and becomes zero at frequencies equal to integral multiples of the frame frequency $f_p$. Similarly, the second and the third differences $1 - P_2(z)$ and $1 - P_3(z)$ resorted to in the second embodiment should have factors $1 + z^{-H}$ and $1 - z^{-1}$, respectively, where:

$H = f_n/f_h.$

When the third difference $1 - P_3(z)$ should be given by the term $1 - z^{-1}$ itself, the third predictive filter 62 may be a mere one-sample delay element.

Figure 3:
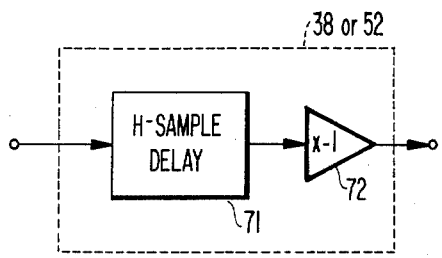
FIGS. 3 through 6 are block illustrations of a few predictive filters for use in code communication systems according to this invention.

Referring now to FIG. 3, a second predictive filter 38 for use in the second embodiment comprises an H-sample delay element 71 and an inverter 72. The transfer function $P_2(z)$ is equal to $-z^{-H}$. The second difference $1 - P_2(z)$ is given by $1 + z^{-H}$.

Figure 4:
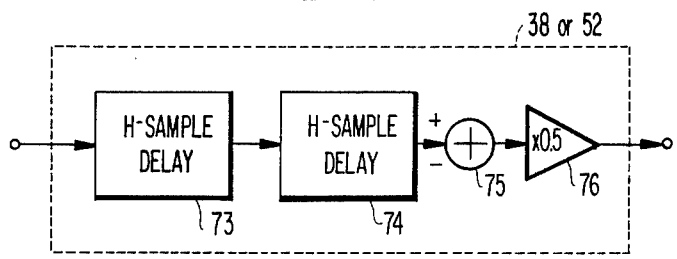

Referring to FIG. 4, another second predictive filter 38 comprises a first H-sample delay element 73, a second H-sample delay element 74 for giving a delay of further H samples to the output signal of the first delay element 73, a subtractor 75 for subtracting H-sample delayed signals from 2H-sample delayed signals, and an inverter 76 for the output signals of the subtractor 75. The second difference $1 - P_2(z)$ is given by $(1 + z^{-H})(1 - 0.5z^{-H})$.

Figure 5:
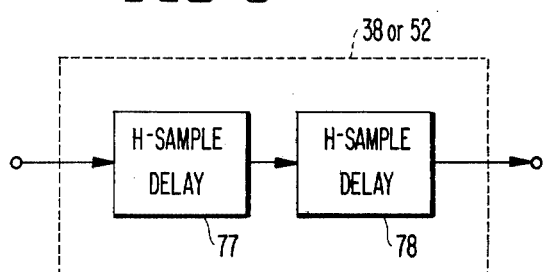

Referring to FIG. 5, still another second predictive filter 38 comprises two series-connected H-sample delay elements 77 and 78. The second difference $1 - P_2(z)$ is given by $(1 + z^{-H})(1 - z^{-H})$.

Inasmuch as the interline correlation of the television signals decreases with an increase in the number of intervening lines, the effect of suppression of the carrier chrominance signal component generally decreases when the second predictive filter 38 illustrated with reference to FIG. 3 is replaced by that shown in FIG. 4 and by that depicted in FIG. 5. On the other hand, the second predictive filter 38 according to the example illustrated with reference to FIG. 5 effectively suppresses transmission of the luminance signal component. The transmission characteristics are substantially flat with the filter shown in FIG. 4 and becomes about twice as large with the filter shown in FIG. 3. According to the second embodiment, prediction errors in the second prediction error signals $E_2(z)$ are suppressed by the third predictive path 61. It is therefore preferable to choose one of the filters 38 shown in FIGS. 3 to 5 in consideration of the transfer function $P_3(z)$ of the third predictive filter 62.

Figure 6:
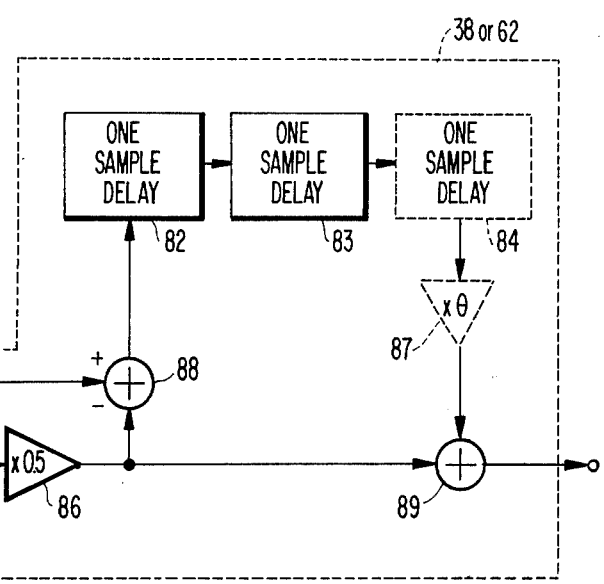

Referring now to FIG. 6, a second predictive filter 38 for use in the first embodiment or a preferred third predictive filter 62 is of a non-recursive type and has a transfer function given by Formula (6). The filter 38 or 62 comprises four one-sample delay elements 81, 82, 83, and 84, a first multiplier 86, a second multiplier 87, a subtractor 88, and an adder 89. The first multiplier 86 multiplies the output signal of the first delay element 81 by a factor of 0.5. The second multiplier 87 multiplies the output signal of the fourth delay element 84 by a factor $\theta$ used in Formula (6). When the digital signal supplied to the first delay element 81 and the subtractor 88 is a binary signal, the first multiplier 86 may merely shift the binary digital signal by one digit towards the less significant digit. When the factor $\theta$ is represented by:

$\theta = 1 - 2^{-K},$ where $k$ represents a positive integer, the second multiplier 87 may shift the binary signal supplied thereto by $k$ digits towards the less significant digit. If the factor $\theta$ is equal to unity, the second multiplier 87 may be dispensed with as indicated with dashed lines.

A composite feedback predictive code communication system according to a third embodiment of this invention described hereunder is operable at a sub-Nyquist sampling frequency $f_s$ that is selected to be equal to an integral multiple of the line frequency $f_h$ in a frequency range of about twice the subcarrier frequency $2f_c$. As described in another Japanese technical publication, Densi Tusin Gakkai Gizyutu Kenkyu Hokoku (Technical Research Report of the Institute of Electronics and Communication Engineers of Japan), Vol. 75, No. 98, CS75-69, reported by four Japanese gentlemen, of which two are Tatsuo Ishiguro and Yukihiko Iijima mentioned above, under the title of "32 Mb/s Tyokusetu-hugoka (HO-DPCM) Kara Terebi Denso-hosiki" (Color television transmission by 32 Mb/s direct encoding (HO-DPCM)) in September, 1975, the sub-Nyquist sampling frequency for conventional intraframe predictive encoding has been set at an odd integral multiple of a half of the line frequency in order to reduce the fold-over distortion inevitably introduced into the sample signals during the sub-Nyquist sampling. As a result, it has been impossible to simultaneously carry out interframe predictive encoding. This is because the sub-Nyquist frequency of an odd integral multiple of a half of the line frequency renders it impossible to sample those picture elements from two adjacent fields which correspond to each other in space. In contrast, it is possible to carry out correct interframe prediction by controlling the phase of sampling for the respective frames so as to sample the corresponding picture elements. It is also possible even with the sub-Nyquist sampling frequency selected to be equal to an integral multiple of the line frequency by controlling the pahse of sampling for the respective lines so as to sample the picture elements in two adjacent lines with a phase difference of 180° and so as to sample those picture elements in two adjacent frames which correspond in space to each other.

Referring to FIG. 7, the sampling device 21 of a composite feedback predictive code communication system according to the third embodiment comprises an analog-to-digital converter 29 operable at twice the sub-Nyquist sampling frequency $2f_s$, namely, about four times the subcarrier frequency $4f_c$, and a luminance signal high-rejection filter 90 for eliminating the high-frequency components of the luminance signal component from the digital television signal in the manner later described. The sampling device 21 further comprises a re-sampler 91 responsive to re-sampling pulses of the sub-Nyquist frequency $f_s$, namely, about twice the subcarrier frequency $2f_c$, for re-sampling the high-eliminated digital television signal so as to put the fold-over components produced by re-sampling into frequency interleaved relation to the carrier chrominance signal component.

Figure 8:
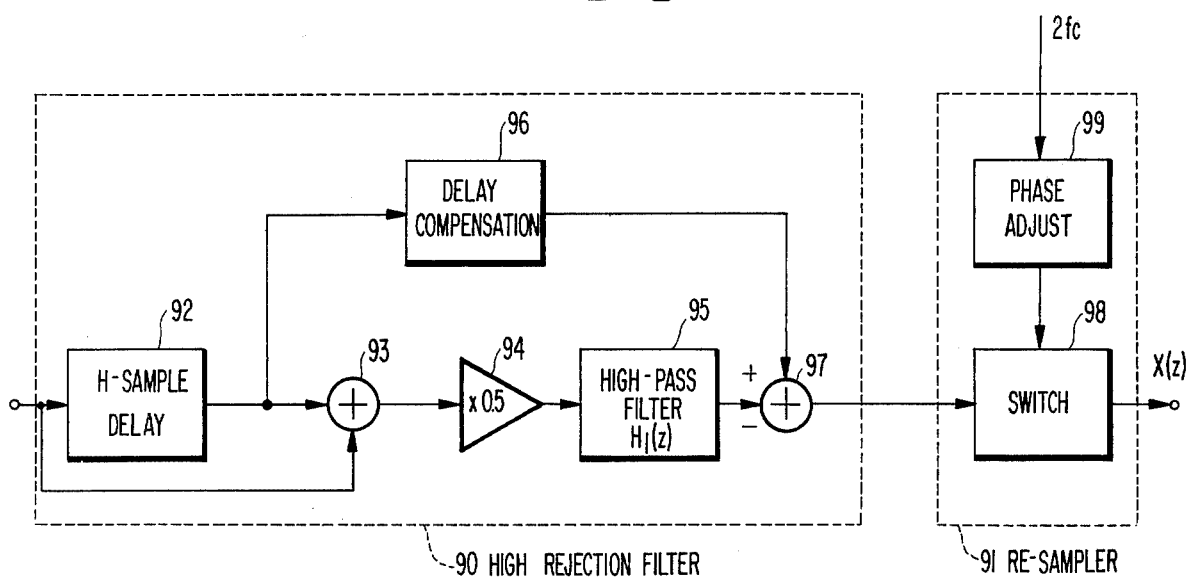
FIG. 8 is a block diagram of a luminance signal high-rejection filter for use in a code communication system according to the third embodiment.

Referring to FIG. 8, an example of the luminance signal high-rejection filter 90 comprises a line memory or H-sample delay element 92 and an adder 93 connected as shown. Inasmuch as the phase of the subcarrier is reversed in adjacent lines as described hereinabove, the signal derived from the adder 93 does not include an appreciable carrier chrominance signal component but the higher harmonics of the line frequency $f_h$ of the luminance signal component. The filter 90 further comprises a multiplier 94 for multiplying the higher harmonics by a factor of 0.5 to adjust the gain of the luminance signal component and a high-pass filter 95 for letting those high-frequency components of the luminance signal component to pass therethrough which overlap in the frequency domain with the carrier chrominance signal component. For the digital television signals derived at the sampling frequency of about four times the subcarrier frequency $4f_c$, the high-pass filter 95 for letting signals of the frequency adjacent to the subcarrier frequency $f_c$ to pass therethrough may have a transfer function $H_1(z)$ defined by:

$$H_1(z) = (1 - z^{-2})^2(1 + z^{-4})(1 + z^{-8})/16, \qquad (7)$$

and may be realized by the use of digital delay elements and digital logic elements. The high-rejection filter 90 still further comprises a delay compensation circuit 96 for delaying the H-sample delayed signals by a further delay equal to the delay in the high-pass filter 95, namely, eight sampling periods in case where the transfer function of the high-pass filter 95 is given by Equation (7). The high-rejection filter 90 yet further comprises a subtractor 97 for subtracting the high-frequency components of the luminance signal component from the further delayed digital television signals. Those high-frequency components of the luminance signal component which overlap with the carrier chrominance signal component in the frequency domain are thus eliminated from the output signals of the subtractor 97.

Figure 9:
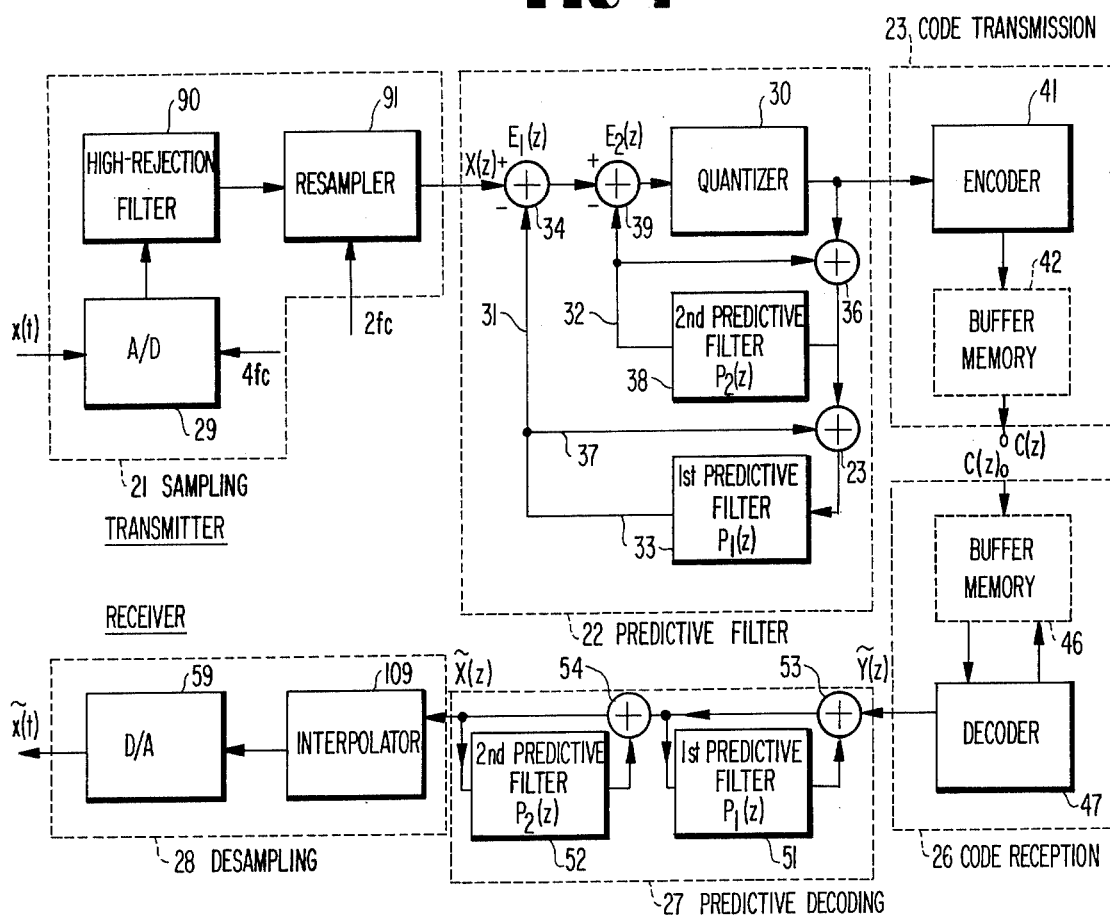
FIG. 9 schematically shows picture elements sampled out of a portion of a field by a sampling device used in a code communication system according to the third embodiment.

Referring also to FIG. 9, the re-sampler 91 comprises a re-sampling switch 98 responsive to phase-controlled or phase-adjusted re-sampling pulses to be presently described for sampling the output signals of the subtractor 97 to produce the signal samples $X(z)$, and a phase adjuster 99 for controlling the phase of the re-sampling pulses during the respective line and the respective frame periods to produce the phase-adjusted re-sampling pulses. The phase-adjusted re-sampling pulses make the switch 98 sample the subtractor output signals during two adjacent line periods with a phase difference of about 180°. As a result, the signal samples $X(z)$ represent picture elements in staggered space relation in each field as designated with small circles, such as 101, 102, and 103. Furthermore, the phase-adjusted re-sampling pulses make the switch 98 sample the subtractor output signals during every frame period in phase relative to scan of the respective frames so that the signal samples $X(z)$ may represent picture elements positioned at the same points in space, such as those illustrated with the small circles in every frame. As described hereinabove, sampling of a television signal at the sub-Nyquist sampling frequency $f_s$ results in folding of higher harmonics of the line frequency $Nf_h$ ($N$: a positive integer) over higher harmonics $(M + \frac{1}{2})f_h$ ($M$: a positive integer) and in folding of higher harmonics $(N + \frac{1}{2})f_h$ over higher harmonics $Mf_h$. In an NTSC television signal wherein the subcarrier frequency $f_c$ is equal to $(227 + \frac{1}{2})f_h$, the carrier chrominance signal component concentrated adjacent to $(N + \frac{1}{2})f_h$ is folded over adjacent to $Mf_h$. The luminance signal component concentrated adjacent to $Nf_h$ is folded over adjacent to $(M + \frac{1}{2})f_h$. Being prevented by the high-rejection filter 90 from overlapping with the carrier chrominance signal component, the higher harmonics of the luminance signal component are not subjected to fold over although folding of the carrier chrominance signal component is unavoidable over the adjacency of $(M + \frac{1}{2})f_h$.

Referring back to FIGS. 6 and 7, the transfer function $P_2(z)$ of the second predictive filter 38 or 52 may be equal to:

$$0.5z^{-1} + \theta z^{-2} - 0.5\theta z^{-3}$$

for the sub-Nyquist sampling frequency $f_s$. The second predictive filter 38 or 52 may therefore comprise only two of the second to fourth 1-sample delay elements 82 to 84. The desampling device 28 comprises an interpolation filter 109 for rendering the reproduced samples $\tilde{X}(z)$ exempted from the fold-over distortion caused by the sub-Nyquist sampling.

Figure 10:
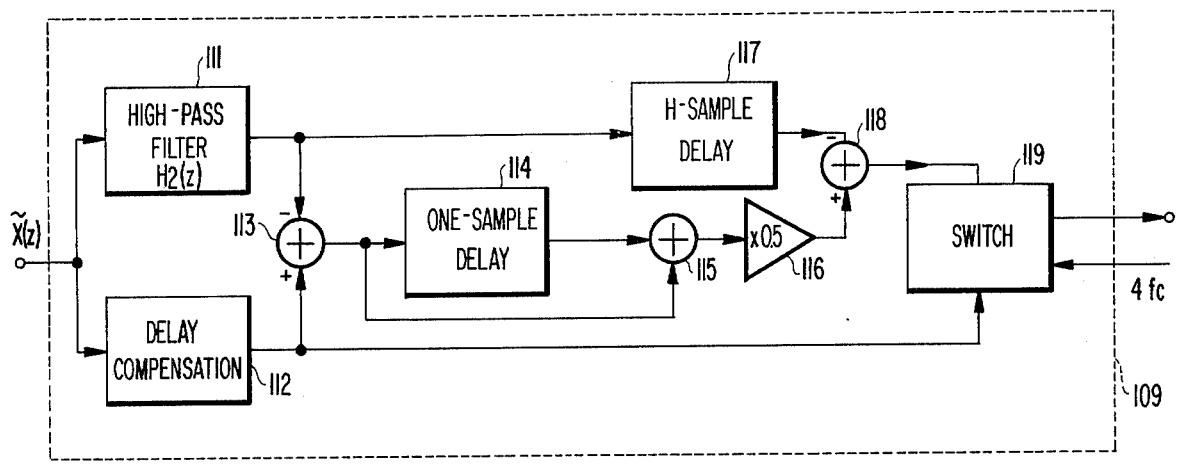
FIG. 10 is a block illustration of an interpolation filter for use in a code communication system according to the third embodiment.

Referring again to FIG. 9 and newly to FIG. 10, the interpolation filter 109 calculates, in response to a pair of reproduced samples $\tilde{X}(z)$ representative of two adjacent picture elements 101 and 102 and to another reproduced sample $\tilde{X}(z)$ for a picture element 103 adjacent in the next previous line to the two adjacent picture elements 101 and 102, an interpolated sample for a picture element 110 positioned between the two adjacent picture elements 101 and 102. More particularly, an example of the interpolation filter 109 comprises a high-pass filter 111 responsive to the reproduced samples $\tilde{X}(z)$ for allowing the carrier chrominance signal component to pass therethrough. Inasmuch as the reproduced samples $\tilde{X}(z)$ are produced at about twice the subcarrier frequency $2f_c$, the high-pass filter 111 may have a transfer function $H_2(z)$ defined by:

$$H_2(z) = (1 - z^{-1})^2(1 + z^{-2})(1 + z^{-4}). \qquad (8)$$

The interpolation filter 109 further comprises a delay compensation circuit 112 for delaying the reproduced samples $\tilde{X}(z)$ by a delay in the high-pass filter 111, namely, four re-sampling periods in case where the transfer function of the high-pass filter 111 is given by Equation (8), a first subtractor 113 for subtracting the extracted carrier chrominance signal component from the delay compensated samples to produce the luminance signal component, a one-sample delay element 114 for delaying the luminance signal component by one re-sampling period, an adder 115 for adding the luminance signal component and the delayed luminance signal component, and a multiplier 116 for multiplying the output signal of the adder 115 by a factor of 0.5 to produce that average of the luminance signal components for two adjacent picture elements, such as 101 and 102, which is representative of the luminance of a picture element, such as 110, positioned between the two adjacent picture elements. The interpolation filter 109 still further comprises a line memory or H-sample delay element 117 for delaying the carrier chrominance signal component by a line period and a second subtractor 118 for subtracting the delayed carrier chrominance signal component from the average luminance signal component, namely, for adding a carrier chrominance signal component for the picture element 103 with the phase reversed and the average luminance signal component for the picture element 110. The output signals of the second subtractor 118 are thus interpolated signal samples representative of picture elements depicted with crosses, such as 110. The interpolation filter 109 yet further comprises a switch 119 responsive to the sampling pulses of twice the sub-Nyquist sampling frequency $2f_s$ for alternately switching the delay-compensated samples for the picture elements, such as 101 and 102, and the interpolated samples for the picture elements, such as 110. An impulse response $I(z)$ of the interpolation filter 109 for the carrier chrominance signal component is therefore given by:

$$I(z) = 1 - z^{-L},$$

where $L$ represents the number of signal samples $X(z)$ or reproduced samples $\tilde{X}(z)$ produced during each line period. As a result, the interpolation filter 109 rejects those components of the carrier chrominance signal component which are of the frequency $Mf_h$ and removes the fold-over distortion produced during the sub-Nyquist sampling.

As described hereinabove, a code communication system according to the third embodiment is operable at a sub-Nyquist sampling frequency $f_s$. In this connection, it should be noted that the analog-to-digital converter 29 in an example of the third embodiment illustrated with reference to FIG. 7 may be named a "pre-sampler." In fact, the luminance signal high-rejection filter 90 may be an analog filter and placed prior to the analog-to-digital converter 29. The filter 90 may even be dispensed with. In either event, the analog-to-digital converter 29 should be substituted for the "re-sampling" switch 98 and be operable at the sub-Nyquist sampling frequency $f_s$ with the phase of the sampling pulses controlled as described. It should also be noted that the line memory 92 and the adder 93 serve to separate the luminance signal component from the television signal and that the high-pass filter 111 and the first subtractor 113 serve to separate the reproduced samples $\tilde{X}(z)$ into luminance signal samples and carrier chrominance signal samples. Such separation may be carried out in various other ways, such as by the use of two line memories.

Figure 11:
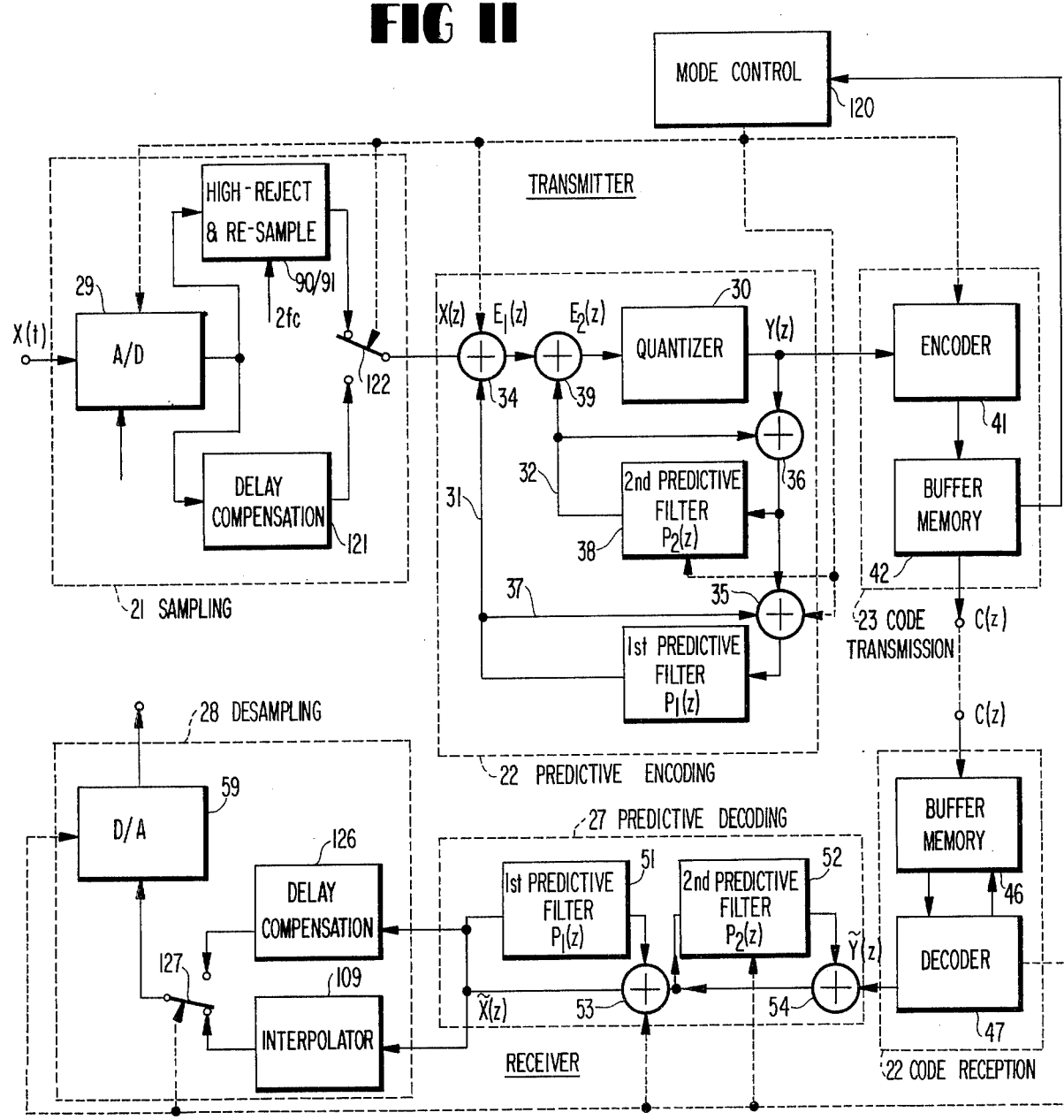
FIG. 11 is a block diagram of a composite feedback predictive code communication system according to a fourth embodiment of this invention.
Figure 12:
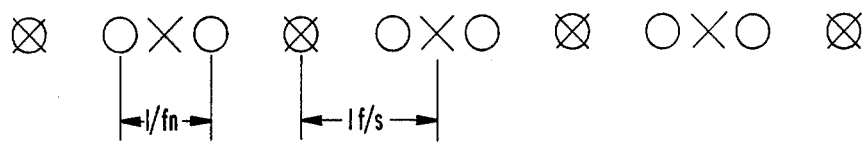
FIG. 12, depicted below FIG. 1, schematically shows picture elements selected out of a horizontal line by a sampling device used in a code communication device according to the fourth embodiment.
Figure 13:
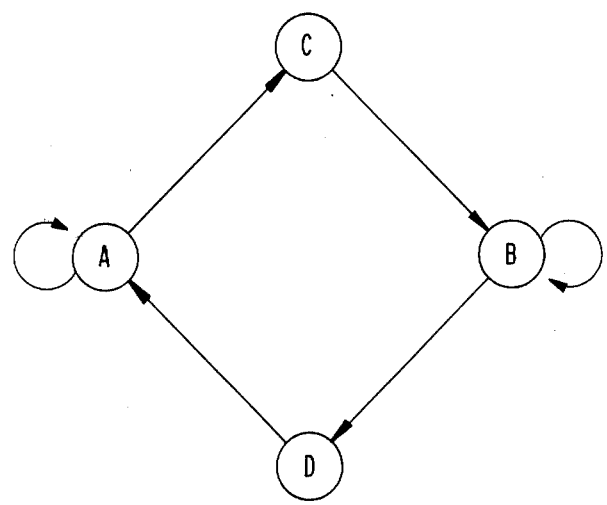
FIG. 13 schematically illustrates operation of a code communication system according to the fourth embodiment.

Turning to FIGS. 11 to 13, a predictive code communication system according to a fourth embodiment of this invention is specifically adapted to transmission of variable length codes from the transmitter to the receiver. Under the circumstances, the code transmission and reception device 23 and 26 should include the first and second buffer memories 42 and 46. The first buffer memory 42 overflows when the codes are produced by the encoder 41 at a rate beyond an upper limit determined by the buffer memory capacity and the transmission rate $f_r$. With the buffer occupancy of the buffer memory 42 always monitored, a transmitter according to the fourth embodiment is operable in a normal mode A in which the signal samples $X(z)$ are produced at about three times the subcarrier frequency $3f_c$. So long as the buffer memory 42 does not tend to overflow, the transmitter remains in the normal mode A of operation as symbolized with an almost circular arrow. When the buffer memory 42 tends to overflow, the transmitter is switched to a sub-Nyquist mode B in which the signal samples $X(z)$ are produced at the sub-Nyquist sampling frequency $f_s$ described in conjunction with the third embodiment and remains in the latter mode B as indicated with another almost circular arrow until the buffer occupancy decreases to a predetermined value. The problems here are that picture elements depicted with small circles are sampled during the normal mode A of operation while those designated with crosses are sampled during the sub-Nyquist mode B of operation and that the signal samples held by the first predictive filter 33 during one of the normal and the sub-Nyquist modes A and B of operation do not serve well for prediction in the other mode of operation. The transmitter according to the fourth embodiment is therefore operable also in transit modes C and D wherein intraframe prediction is carried out with the sampling frequency of the normal or the sub-Nyquist mode into which operation of the transmitter should be switched, so that the signal samples held by the frame memory 33 may be changed in the meantime to those for the operation in the other mode. The overall transfer characteristic of the predictive encoder 22 is, for example:

for mode A: $(1 - z^{-F})(1 - 0.5z^{-1})(1 - \theta z^{-3})$,
for mode B: $(1 - z^{-F})(1 - 0.5z^{-1})(1 - \theta z^{-2})$,
for mode C: $(1 - 0.5z^{-1})(1 - \theta z^{-2})$,
and
for mode D: $(1 - 0.5z^{-1})(1 - \theta z^{-3})$.

Referring more particularly to FIG. 11, the buffer memory 42 comprises counter means (illustrated in patent application Ser. No. 657,799 filed by Tatsuo Ishiguro on Feb. 13, 1976, separately of the buffer memory means) for always monitoring the buffer occupancy of the buffer memory means. Responsive to the signal produced by the counter means to indicate the buffer occupancy, a transmission mode controller 120 produces an encoder mode control signal. So long as the buffer occupancy is below a predetermined value, the control signal is put in a first encoding control state. When the buffer occupancy tends to grow or beyond the predetermined value, the control signal is put in a second encoding control state. When the buffer occupancy decreases below the predetermined value, the control signal is returned to the first state. Inasmuch as it is sufficient that the intraframe predictive encoding is carried out during only one frame period, the transmitter may be put in the transit modes C and D of operation by timing circuits (not shown) accompanied by the elements concerned. Responsive to the control signal symbolized by a broken line starting from the mode controller 120 and arriving at the encoder 41, the latter interposes mode codes indicative of the first and second states of the control signal in the predictive encoded signals.

Being coupled to the mode controller 120, the analog-to-digital converter 29 samples the television signal by normal sampling pulses when the control signal is in the first state and by modified sub-Nyquist sampling pulses when the control signal is in the second state. The normal sampling pulses have a normal frequency selected to be equal to an integral multiple of the frame frequency of the television signal in a frequency range of about three times the subcarrier frequency $3f_c$. Although not used in the analog-to-digital converter 29 being illustrated, sub-Nyquist sampling pulses have a sub-Nyquist sampling frequency selected to be equal to an integral multiple of the frame frequency in a frequency range of about twice the subcarrier frequency $2f_c$. The modified sub-Nyquist sampling pulses have twice the sub-Nyquist frequency, namely, about four times the subcarrier frequency $4f_c$. The sampling device 21 comprises a delay compensation circuit 121 of a delay equal to that in the luminance signal high-rejection filter 90. The sampling device 21 further comprises a sampling switch 122 for selectively supplying the signal samples derived by the normal and sub-Nyquist sampling pulses to the predictive encoder 22 when the control signal is in the first and second states, respectively.

In the example of the fourth embodiment being illustrated, the predictive encoder 22 is similar to those illustrated with reference to FIGS. 1 and 7. It is, however, to be noted that the first predictive path 31 to which the signal samples are supplied has one of the differences $1 - P_1(z)$ and $1 - P_2(z)$ that is equal to $1 - z^{-F}$. Supplied with the control signal, the first subtractor 34 produces the first prediction error signals $E_1(z)$ after lapse of the above-mentioned only one frame period from the time at which the state of the control signal is changed between the first and second states, namely, during the normal and sub-Nyquist modes A and B of operation of the transmitter. The first subtractor 34 produces the signal samples unchanged during the only one frame period, namely, during the transit modes C or D of operation. Likewise, the first adder 35 adds the first filter and the second adder output signals in the modes A and B of operation and produces the second adder output signals unaltered during the modes C and D. Such a subtractor or an adder may readily be realized by an ALU (arithmetic logic unit). The second predictive filter 38 is made to have the second transfer function $P_2(z)$ for the normal mode A and the sub-Nyquist mode B when the control signal is in the first and second states, respectively.

Further referring to FIG. 11, the code reception device 26 comprises the buffer memory 46. Responsive to the mode codes read out of the buffer memory 46, the decoder 47 serves as reception mode control means for producing a decoder control signal that is put in a first and a second decoding control state when the mode codes are indicative of the first and second encoding control states of the encoder control signal, respectively.

In the predictive decoder 27, the second adder 54 for the second predictive filter 52 of the second transfer function $P_2(z)$ is supplied with the reproduced prediction error signals. Responsive to the decoder control signal, the first adder 53 adds the first filter and the second adder output signals to produce the reproduced samples during the normal and sub-Nyquist modes A and B of operation of the receiver. The first adder 53 produces the second adder output signals untouched as the reproduced samples during the transit modes C and D of operation. The second transfer function $P_2(z)$ is changed in compliance with the states of the decoder control signal.

The desampling device 28 comprises a delay compensation circuit 126 for making the reproduced samples derived therefrom have the same phase as the reproduced and the interpolated samples produced by the interpolation filter 109. Responsive to the decoder control signal, a desampling switch 127 supplies the output signals of the delay compensation circuit 126 and the interpolation filter 109 to the digital-to-analog converter 59 when the decoder control signal is in the first and second decoding control states, respectively. Similarly, the digital-to-analog converter 59 desamples the reproduced samples supplied through the desampling switch 127 during the normal mode A of operation by normal desampling pulses and desamples the reproduced and the interpolated samples supplied thereto during the sub-Nyquist mode by modified sub-Nyquist desampling pulses. The normal desampling pulses have the normal frequency. Although not used in the digital-to-analog converter 59 being illustrated, sub-Nyquist desampling pulses have the sub-Nyquist frequency. The modified sub-Nyquist desampling pulses have twice the sub-Nyquist frequency.

Figure 14:
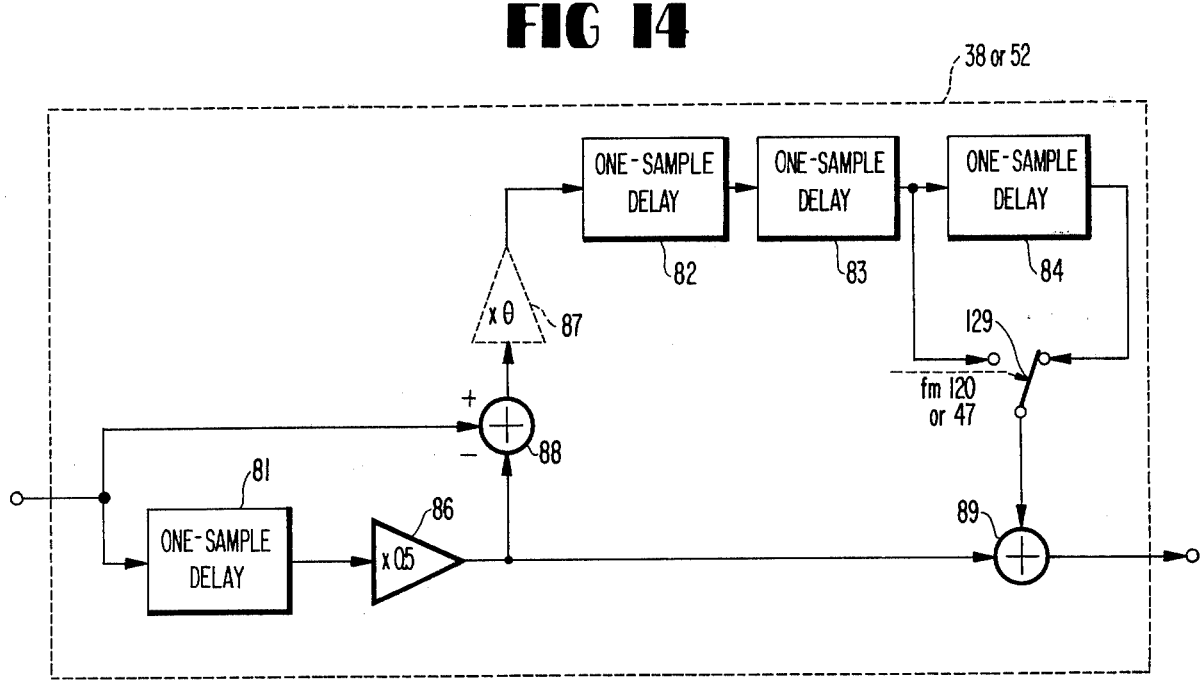
FIG. 14 is a block illustration of a predictive filter for use in a code communication system according to the fourth embodiment.

Finally referring to FIG. 14, a second predictive filter 38 or 52 for use in a code communication system according to the fourth embodiment is of a structure similar to that illustrated with reference to FIG. 6. Inasmuch as the predictive encoding and decoding deal with digital signals at least partly in the codec, it may be surmised without a loss of generality that the signals supplied to the second predictive filter 38 or 52 are digital signals and that the one-sample delay elements 81 to 84 are operative by sampling or desampling pulses supplied thereto through a connection not shown for simplicity of illustration. One of the second to fourth delay elements 82 to 84 of the predictive filter 38 or 52 is shorted by a switch 129 selectively operative by the encoding or decoding control signal. The switch 129 and either the first subtractor 34 and the first adder 35 or the first adder 53 serve as encoding or decoding switch means.

While this invention has thus far been described in conjunction with several preferred embodiments thereof, it is possible as will readily be understood by those skilled in the art to put this invention into practice in various other manners without limitation of the sampling frequency to about three times or twice the sub-carrier frequency. For use in the first embodiment, the sampling frequency is not necessarily be an integral multiple of the line or frame frequency. The predictive encoder 22 may be supplied with analog samples instead of the digital samples. When use is made of digital samples, the sampling device 22 generally produces PCM signals. Both the third and fourth embodiments may comprise three predictive paths as in the second embodiment. The difference $1 - P(z)$ for one of the predictive paths (the second or the third predictive path in the fourth embodiment) may be defined by $(1 - \phi z^{-1})(1 - \theta z^{-3})$ for normal sampling and $(1 - \phi z^{-1})(1 - \theta z^{-2})$ for sub-Nyquist sampling, where $\phi$ represents a factor between zero and unity, inclusive. One of the other two differences when use is made of three predictive paths, may be defined by $(1 + z^{-H})(1 - \phi z^{-H})$. Preferably, $\phi$ is rendered equal to 0, 0.5, or 1. Preferred values of the other factor $\theta$ are 0.5 and 1. The transmission mode controller 120 may be manually operable. With disturbances permitted in the reproduced television signal during about one frame period, it is possible to omit in the fourth embodiment the operation in the transit modes C and/or D. The fourth embodiment is also operable in various modes other than the normal and sub-Nyquist modes. The fourth embodiment may be put into the transit mode C or D of operation during one field period instead of the only one frame period. The transmission mode controller 120 may produce an encoder control signal that is put into the first and second encoding control states instantaneously only when the buffer occupancy decreases and increases past the predetermined value. Alternatively, the mode controller 120 may further make the first and second encoding states of the encoder control signal indicate the transit modes D and C separately of the normal and sub-Nyquist modes A and B, respectively, with the timing circuits mentioned hereinabove dispensed with. The decoder control signal may accordingly be modified. Furthermore, the transmission mode controller 120 may put the encoder control signal into the first and second encoding control states when the buffer occupancy reaches a first predetermined value and a second one somewhat larger than the first value. The reception mode controller may be provided separately of the decoder 47 so as to produce the decoder control signal in response to decoded mode codes supplied thereto from the latter. Except for a system having no error, it is preferable that the frame delay 51 be placed in the predictive decoder 27 nearest to the digital-to-analog converter 59.

What is claimed is:

1. a predictive code communication system for a color television signal including a carrier chrominance signal component which comprises a transmitter and a receiver;

said transmitter comprising:

sampling means for sampling said television signal to produce signal samples;

predictive quantizing means responsive to said signal samples for producing quantized prediction error signals in comliance with a first overall transfer characteristic defined by a product of a first difference $1 - P_1$ and a second difference $1 - P_2$, where $P_1$ represents a first transfer function of frequencies and $P_2$ represents a second transfer function of frequencies, the absolute value of one of said first and second differences being a minimum which is sufficiently smaller than unity at least in the neighborhood of an integral multiple (including unity) of the frame frequency of said television signal, the absolute value of the other of said first and second differences being those minima which are sufficiently smaller than unity at least in the neighborhoods of zero frequency and the subcarrier frequency for said carrier chrominance signal component; and code transmission means responsive to said quantized prediction error signals for transmitting predictive encoded signals to said receiver;

said receiver comprising:

code reception means responsive to said predictive encoded signals for producing reproduced prediction error signals;

predictive decoding means responsive to said reproduced prediction error signals for producing samples in compliance with a second overall transfer characteristic which is an inverse of said first overall transfer characteristic; and desampling means responsive to said reproduced samples for producing a reproduction of said television signal.

2. A predictive code communication system as claimed in claim 1, wherein said predictive quantizing means comprises:

a quantizer responsive to input prediction error signals for producing said quantized prediction error signals;

a first predictive path responsive to said signal samples and to said quantized prediction error signals and having a first transfer characteristic defined by said first difference for producing first prediction error signals;

a second predictive path responsive to said first prediction error signals and to said quantized prediction error signals and having a second transfer characteristic defined by said second difference for producing second prediction error signals; and means for supplying said second prediction error signals to said quantizer as said input prediction error signals.

3. A predictive code communication system as claimed in claim 2, said sampling means being a responsive to sampling pulses of a sampling frequency equal to about three times said subcarrier frequency; wherein one of said first and second differences is equal to $1 - z^{-F}$ and the other of said first and second differences is equal to $(1 - \phi z^{-1})(1 - \theta z^{-3})$, where $z^{-F}$ represents a delay of one frame period of said television signal, $z^{-1}$ and $z^{-3}$ represent delays of one and three sampling periods of said sampling pulses, respectively, $\phi$ represents a first factor between zero and unity, inclusive, and $\theta$ represents a second factor greater than zero and not greater than unity.

4. A predictive code communication system as claimed in claim 3, wherein:

said first predictive path comprises a first predictive filter having said first transfer function $P_1$ and responsive to first filter input signals for producing first filter output signals, a first subtractor for subtracting said first filter output signals from said signal samples to produce said first prediction error signals, a first adder responsive to first adder input signals for producing first adder output signals, and means for supplying said first adder output signals to said first predictive filter as said first filter input signals; and said second predictive path comprises a second predictive filter having said second transfer function $P_2$ and responsive to second filter input signals for producing second filter output signals, a second subtractor for subtracting said second filter output signals from said first prediction error signals to produce said second prediction error signals, a second adder for adding said quantized prediction error signals and said second filter output signals to produce second adder output signals, and means for supplying said second adder output signals to said second predictive filter as said second filter input signals;

said first adder being supplied with said first filter output signals and said second adder output signals as said first adder input signals;

where one of said first and second transfer functions that gives said one of said first and second differences is equal to $z^{-F}$ and the other of said first and second transfer functions is equal to $\phi z^{-3} + \theta z^{-3} - \phi \theta z^{-4}$; $z^{-4}$ being representative of a delay of four sampling periods.

5. A predictive code communication system as claimed in claim 2, wherein said second predictive path comprises:

a third predictive path responsive to said first prediction error signals and to said quantized prediction error signals and having a third transfer characteristic defined by a third difference $1 - P_3$ for producing third prediction error signals; and a fourth path responsive to said third prediction error signals and to said quantized prediction error signals and having a fourth transfer characteristic defined by a fourth difference $1 - P_4$ for producing said input prediction error signals;

where $P_3$ represents a third transfer function of frequencies and $P_4$ represents a fourth transfer function of frequencies, said second difference being equivalent to a product of said third and fourth differences, the absolute value of a first of said first, third, and fourth differences being a minimum at least in the neighborhood of said integral multiple of said frame frequency, the absolute value of a second of said first, third, and fourth differences being minima at least in the neighborhood of odd integral multiples of a half of line frequency of said television signal, the absolute value of a third of said first, third, and fourth differences being a minimum at least in the neighborhood of zero frequency, all said minima being sufficiently smaller than unity.

6. A predictive code communication system as claimed in claim 5, said sampling means being responsive to sampling pulses of a sampling frequency selected to be equal to an integral multiple of said line frequency, wherein said first of said first, third, and fourth differences is equal to $1 - z^{-F}$, said second of said first, third, and fourth differences is equal to $(1 + z^{-H})(1 - \phi z^{-H})$, and said third of said first, third, and fourth differences comprises a factor $1 - z^{-1}$, where $z^{-F}$ and $z^{31\ H}$ represent delays of one frame and one line period of said television signal, respectively, $z^{-1}$ represents a delay of one sampling period of said sampling pulses, and $\phi$ represents a factor between zero and unity, inclusive.

7. A predictive code communication system as claimed in claim 5, wherein said absolute value of said third of said first, third, and fourth differences being a further minimum in the neighborhood of said subcarrier frequency which is sufficiently smaller than unity.

8. A predicitve code communication system as claimed in claim 7, said sampling device being responsive to sampling pulses of a sampling frequency selected to be equal to an integral multiple of said line frequency in a frequency range of about three times the signal bandwidth of said television signal, wherein said first of said first, third, and fourth differences is equal to $1 - z^{-F}$, said second of said first, third, and fourth differences is equal to $(1 + z^{-H})(1 - \phi z^{-H})$, and said third of said first, third, and fourth difference is equal to $(1 - \phi z^{-1})(1 - \theta z^{-3})$, where $z^{-F}$ and $z^{-H}$ represent delays of one frame and one line period of said television signal, respectively, $z^{-1}$ and $z^{-3}$ represent delays of one and three sampling periods of said sampling pulses, respectively, $\phi$ represents a first factor between zero and unity, inclusive, and $\theta$ represents a second factor greater than zero and not greater than unity.

9. A predictive code communication system as claimed in claim 8, wherein:
said first predictive path comprises a first predictive filter having said first transfer function $P_1$ and responsive to first filter input signals for producing first filter output signals, a first subtractor for subtracting said first filter output signals from said signal samples to produce said first prediction error signals, a first adder responsive to first adder input signals for producing first adder output signals, and means for supplying said first adder output signals to said first predictive filter as said first filter input signals;
said third predictive path comprises a second predictive filter having said third transfer function $P_3$ and responsive to second filter input signals for producing second filter output signals, a second subtractor for subtracting said second filter output signals from said first prediction error signals to produce said third prediction error signals, a second adder responsive to second adder input signals for producing second adder output signals, and means for supplying said second adder output signals to said second predictive filter as said second filter input signals; and
said fourth predictive path comprises a third predictive filter having said fourth transfer function $P_4$ and responsive to third filter input signals for producing third filter output signals, a third subtractor for subtracting said third filter output signals from said third prediction error signals to produce said input prediction error signals, a third adder for adding said quantized prediction error signals and said third filter output signals to produce third adder output signals, and means for supplying said third adder output signals to said third predictive filter as said third filter input signals;
said first adder being supplied with said first filter output signals and said second adder output signals as said first adder input signals, said second adder being supplied with said second filter output signals and said third adder output signals as said second adder input signals;
where one of said first, third, and fourth transfer functions that gives said one of said first, third, and fourth differences is equal to $z^F$, another of said first, third, and fourth transfer functions that gives said second of said first, third, and fourth differences is equal to $(z^{-H} - \phi z^{-H} - \phi z^{-2H})$, and still another of said first, third, and fourth transfer functions is equal to $\phi z^{-1} + \theta z^{-3} - \phi\theta z^{-4}$; $z^{-2H}$ being representative of a delay of two line periods, $z^{-4}$ being representative of a delay of four sampling periods.

10. A predictive code communication system as claimed in claim 1, wherein:
said sampling means comprises:
a sampler responsive to sampling pulses of a sampling frequency in a sub-Nyquist sampling frequency range for sampling sampler input signals into said signal samples;
phase control means for controlling phase of said sampling pulses during respective line and respective frame periods of said television signal so as to make said sampling pulses have a phase difference of about 180° in two adjacent line periods and about same phase in every frame period; and
signal supply means for supplying said television signal to said sampler as said sampler input signals; and
said desampling means comprises:
an interpolator for composing an interpolated sample representative of an interpolated picture element in response to reproduced samples representative of picture elements positioned adjacent in space to said interpolated picture element.

11. A predictive code communication system as claimed in claim 10, wherein said interpolator comprises:
first means for separating said reproduced samples into luminance signal samples and carrier chrominance signal samples;
second means, responsive to each pair of said luminance signal samples that is representative of two adjacent picture elements positioned along a line of a frame, for producing an interpolated luminance signal sample representative of luminance of said interpolated picture element, said interpolated picture element being positioned along said line between said two adjacent picture elements; and
third means, responsive to said interpolated luminance signal sample and to one of said carrier chrominance signal samples that is representative of chrominance of a picture element positioned along a next previous line of said frame with said phase difference in terms of said sampling pulses had relative to said two adjacent picture elements, for composing said interpolated sample.

12. A predictive code communication system as claimed in claim 11, wherein said third means comprises means for adding said one carrier chrominance signal sample, with its phase reversed, and said interpolated luminance signal sample.

13. A predictive code communication system as claimed in claim 12, wherein said first means comprises:
   a high-pass filter for extracting said carrier chrominance signal samples from said reproduced signal samples; and
   means for subtracting said carrier chrominance signal samples from the reproduced samples from which said carrier chrominance signal samples are extracted, respectively, to produce said luminance signal samples.

14. A predictive code communication system as claimed in claim 10, wherein said sampling means further comprises high-rejection means operatively coupled to said sampler for eliminating luminance signal components of frequencies equal in the neighborhood of said subcarrier frequency to higher harmonics of said line frequency from said signal samples.

15. A predictive code communication system as claimed in claim 10, wherein said signal supply means comprises:
   a pre-sampler responsive to pre-sampling pulses of twice said sampling frequency for pre-sampling said television signal to produce signal pre-samples;
   high-rejection means for eliminating luminance signal sample components of frequencies equal in the neighborhood of said subcarrier frequency to higher harmonics of said line frequency from said signal pre-samples to produce high-rejected pre-samples; and
   means for supplying said high-rejected pre-samples to said sampler as said sampler input signals.

16. A predictive code communication system as claimed in claim 15, wherein said high-rejection means comprises:
   a delay element for delaying said signal pre-samples by a line period of said television signal to produce delayed pre-samples;
   means for adding said signal pre-samples and said delayed pre-samples to produce sum samples;
   a high-pass filter for letting said luminance signal sample components of said sum samples to pass therethrough to produce high-frequency component samples; and
   means for subtracting said high-frequency component samples from the signal pre-samples from which said high-frequency component samples are produced, respectively, to produce said high-rejected pre-samples.

17. A predictive code communication system as claimed in claim 10, wherein said predictive quantizing means comprises:
   a quantizer responsive to input prediction error signals for producing said quantizing prediction error signals;
   a first predictive path responsive to said signal samples and to said quantized prediction error signals and having a first transfer characteristic defined by said first difference for producing first prediction error signals;
   a second predictive path responsive to said first prediction error signals and to said quantized prediction error signals and having a second transfer characteristic defined by said second difference for producing second prediction error signals; and
   means for supplying said second prediction error signals to said quantizer as said input prediction error signals.

18. A predictive code communication system as claimed in claim 17, wherein one of said first and second differences is equal to $1 - z^{-F}$ and the other of said first and second differences is equal to $(1 - \phi z^{-1})(1 - \theta z^{-2})$, where $z^{-F}$ represents a delay of one frame period of said television signal, $z^{-1}$ and $z^{-2}$ represent delays of one and two sampling periods of said sampling pulses, respectively, $\phi$ represents a first factor between zero and unity, inclusive, and $\theta$ represents a second factor greater than zero and not greater than unity.

19. A predictive code communication system as claimed in claim 17, wherein said second predictive path comprises:
   a third predictive path responsive to said first prediction error signals and to said quantized prediction error signals and having a third transfer characteristic defined by a third difference $1 - P_3$ for producing third prediction error signals; and
   a fourth predictive path responsive to said third prediction error signals and to said quantized prediction error signals and having a fourth transfer characteristic defined by a fourth difference $1 - P_4$ for producing said second prediction error signals;
   where $P_3$ represents a third transfer function of frequencies and $P_4$ represents a fourth transfer function of frequencies, said second difference being equal to a product of said third and fourth difference, the absolute value of a first of said first, third, and fourth differences being a minimum at least in the neighborhood of said integral multiple of said frame frequency, the absolute value of a second of said first, third, and fourth differences being minima at least in the neighborhood of odd integral multiples of a half of said line frequency, the absolute value of a third of said first, third, and fourth differences being minima at least in the neighborhoods of zero frequency and said subcarrier frequency, all said minima being sufficiently smaller than unity.

20. A predictive code communication system as claimed in claim 19, wherein said first of said first, third, and fourth differences is equal to $1 - z^{-F}$, said second of said first, third, and fourth differences is equal to $(1 + z^{-H})(1 - \phi z^{-H})$, and said third of said first, third, and fourth differences is equal to $(1 - \phi z^{-1}) \times (1 - \theta z^{-2})$, where $z^{-F}$ and $z^{-H}$ represent delays of one frame and one line period of said television signal, respectively, $z^{-1}$ and $z^{-2}$ represent delays of one and two sampling periods of said sampling pulses, respectively, $\phi$ represents a first factor between zero and unity, inclusive, and $\theta$ represents a second factor greater than zero and not greater than unity.

21. A predictive code communication system as claimed in claim 1, wherein:
   said transmitter further comprises:
   transmission mode control means for producing an encoder control signal that is selectively put in one of a first and a second encoding control state at a time; and
   sampling switch means coupled to said mode control means and to said sampling means for making the latter sample said television signal in response to normal and sub-Nyquist sampling pulses when said control signal is in said first and second states, respectively; said normal sampling pulses having a normal frequency selected in a frequency range of about three times said subcarrier frequency, said sub-Nyquist sampling pulses having a sub-Nyquist frequency selected in a frequency range of about twice said subcarrier frequency.

22. A predictive code communication system as claimed in claim 21, wherein said sampling means comprises:
   phase control means for controlling phase of said sub-Nyquist sampling pulses during respective line and respective frame periods of said television signal to make said sub-Nyquist sampling pulses have a phase difference of about 180° in two adjacent line periods and about same phase in every frame period; and
   a sampler coupled to said sampling switch means and to said phase control means for sampling said television signal into said signal samples in response to said normal and the phase controlled sub-Nyquist sampling pulses when said control signal is in said first and second states, respectively.

23. A predictive code communication system as claimed in claim 21, said first predictive function $P_1$ being equal to a delay of one frame period, wherein said predictive quantizing means comprises encoding switch means coupled to said mode control means for temporarily rendering said overall predictive characteristic equal to said second difference during only one frame period from the time at which the state of said control signal is changed into said first and second states.

24. A predictive code communication system as claimed in claim 23, wherein said predictive quantizing means further comprises:
   a quantizer responsive to input prediction error signals for producing said quantized prediction error signals;
   a first predictive filter having said first transfer function $P_1$ and responsive to first filter input signals for producing first filter output signals, first subtractor means supplied with said signal samples and said first filter output signals for producing first subtractor output signals, first adder means supplied with adder input signals and said first filter output signals for producing first adder output signals, and means for supplying said first adder output signals to said first predictive filter as said first filter input signals; and
   a second predictive filter having said second transfer function $P_2$ and responsive to second filter input signals for producing second filter output signals, second subtractor means for subtracting said second filter output signals from said first subtractor output signals to produce said input prediction error signals, second adder means for adding said quantized prediction error signals and said second filter output signals to produce second adder output signals, and means for supplying said second adder output signals to said second predictive filter and said first adder means as said second filter input signals and as said adder input signals;
   said encoding switch means being operatively coupled to said first subtractor and adder means and making said first subtractor means produce said signal samples minus said first filter output signals as said first subtractor output signals and said first adder means produce said first filter output signals plus said second adder output signals as said first adder output signals after lapse of said only one frame period while making said first subtractor means produce said signal samples alone as said first subtractor output signals and said first adder means produce said second adder output signals alone as said first adder output signals during said only one frame period.

25. A predictive code communication system as claimed in claim 24, wherein said encoding switch means is operatively coupled further to said second predictive filter to render said second transfer function $P_2$ equal to $\phi z_n^{-1} + \theta z_n^{+3} - \phi\theta z_n^{-4}$ when said control signal is in said first state and equal to $\phi z_s^{-1} + \theta z_s^{-2} - \phi\theta z_s^{-3}$ when said control signal is in said second state, where $z_n^{-1}$, $z_n^{-3}$, and $z_n^{-4}$ represent delays of one, three, and four sampling periods of said normal sampling pulses, respectively, $z_s^{-1}$, $z_s^{-2}$, and $z_s^{-3}$ represent delays of one, two, and three sampling periods of said sub-Nyquist sampling pulses, respectively, $\phi$ represents a first factor between zero and unity, inclusive, and $\theta$ represents a second factor greater than zero and not greater than unity.

26. A predictive code communication system as claimed in claim 23, wherein said predictive quantizing means further comprises:
   a quantizer responsive to input prediction error signals for producing said quantized prediction error signals;
   a first predictive filter having said first transfer function $P_1$ and responsive to first filter input signals for producing first filter output signals, first subtractor means supplied with said signal samples and said first filter output signals for producing first subtractor output signals, first adder means supplied with first adder input signals and said first filter output signals for producing first adder output signals, and means for supplying said first adder output signals to said first predictive filter as said first filter input signals;
   a second predictive filter having a third transfer function $P_3$ of frequencies and responsive to second filter input signals for producing second filter output signals, second subtractor means for subtracting said second filter ouput signals from said first subtractor output signals to produce second subtractor output signals, second adder means for adding second adder input signals and said second filter output signals to produce second adder output signals, and means for supplying said second adder output signals to said second predictive filter and said first adder means as said second filter input signals and as said first adder input signals; and
   a third predictive filter having a fourth transfer function $P_4$ of frequencies and responsive to third filter input signals for producing third filter output signals, third subtractor means for subtracting said third filter output signals from said second subtractor output signals to produce said input prediction error signals, third adder means for adding said quantized prediction error signals and said third filter output signals to produce third adder output signals, and means for supplying said third adder output signals to said third predictive filter and said second adder means as said third filter input signals and as said second adder input signals;
   said second difference being equal to a product of a third difference $1 - P_3$ (one minus said third transfer function) and a fourth difference $1 - P_4$ (one minus said fourth transfer function); said encoding switch means being operatively coupled to said first subtractor and adder means and making said first subtractor means produce said signal samples minus said first filter output signals as said first subtractor output signals and said first adder means produce said first filter output signals plus said second adder output signals as said first adder output signals after lapse of said only one frame period while making said first subtractor means produce said signal samples alone as said first subtractor output signals and said first adder means produce said second adder output signals alone as said first adder output signals during said only one frame period.

27. A predictive code communication system as claimed in claim 26, wherein said encoding switch means is operatively coupled further to one of said second and third predictive filters to render that one of said third and fourth transfer functions $P_3$ and $PHd\ 4$ which said one predictive filter has equal to $\phi z_n^{-1} + \theta z_n^{-3} - \phi 74\, z_n^{-4}$ when said control signal is in said first state and equal to $\phi z_s^{-1} + \theta z_s^{31\ 2} - \phi\theta z_s^{-3}$ when said control signal is in said second state, the other of said third and fourth transfer functions $P_3$ and $P_4$ being equal to $(z^{32\,H} = \phi z^{-H} = \phi z^{-H})$, where $z^{-H}$ and $z^{-2H}$ represent delays of one and two line periods, respectively, $z_n^{-1}$, $z_n^{-3}$, and $z_n^{-4}$ represent delays of one, three, and four sampling periods of said normal sampling pulses, respectively, $z_s^{-1}$, $z_s^{-2}$, and $z_s^{-3}$ represent delays of one, two, and three sampling periods of said sub-Nyquist sampling pulses, respectively, $\phi$ represents a first factor between zero and unity, inclusive, and $\theta$ represents a second factor greater than zero and not greater than unity.

28. predictive code communication system as claimed in claim 21, wherein said code transmission means comprises means coupled to said mode control means for letting said predictive encoded signals include mode codes representative of said first and second states of said control signal when said control signal is in said first and second states, respectively.

29. A predictive code communication system as claimed in claim 28, wherein said code reception means comprises reception mode control means responsive to said mode codes for producing a decoder control signal that is put in a first and a second decoding control state when said mode codes represent said first and second states of said encoder control signal, respectively.

30. A predictive code communication system as claimed in claim 29, wherein said receiver further comprises desampling switch means coupled to said reception mode control means and to said desampling means for making the latter desample said reproduced samples in response to normal and sub-Nyquist desampling pulses when said decoder control signal is in said first and second decoding control states, respectively; said normal and sub-Nyquist desampling pulses having said normal and sub-Nyquist frequencies, respectively.

31. A predictive code communication system as claimed in claim 30, wherein said desampling means comprises:
an interpolator for composing an interpolated sample representative of an interpolated picture element in response to the reproduced samples representative of picture elements positioned adjacent to said interpolated picture element; and
a desample coupled to said desampling switch means and to said interpolator for desampling said reproduced samples in response to said normal desampling pulses and desampling the interpolated and said reproduced samples in response to said sub-Nyquist desampling pulses when said decoder control signal is in said first and second decodeing control states, respectively.

32. A predictive code communication system as claimed in claim 30, said first predictive function $P_1$ being equal to a delay of one frame period, wherein said predictive decoding means comprises decoding switch means coupled to said reception mode control means for temporarily rendering said first overall transfer characteristic equal to an inverse of said second difference during only one frame period from the time at which the state of said decoder control signal is changed into said first and second decoding control states.

33. A predictive code communication system as claimed in claim 32, wherein said predictive decoding means comprises:
a first predictive filter having said first transfer function $P_1$ and responsive to first filter input signals for producing first filter output signals, first adder means supplied with adder input signals and said first filter output signals for producing said reproduced samples, and means for supplying said reproduced samples to said first predictive filter as said first filter input signals; and
a second predictive filter having said second transfer function $P_2$ and responsive to second filter input signals for producing second filter output signals, second adder means for adding said reproduced prediction error signals and said second filter output signals to produce said adder input signals, and means for supplying said adder input signals to said second predictive filter as said second filter input signals;
said decoding switch means being operatively coupled to said first adder means and making said first adder means produce said adder input signals plus said first filter output signals as said reproduced samples after lapse of said only one frame period while making said first adder means produce said adder input signals alone as said reproduced samples during said only one frame period.

34. A predictive code communication system as claimed in claim 33, wherein said decoding switch means is operatively coupled further to said second predictive filter to render said second transfer function $P_2$ equal to $\phi z_n^{-1} + \theta_{n-3} - \phi\theta z_n^{-4}$ when said decoder control signal is in said first decoding control state and equal to $\phi z_{-1} + \theta z_s^{-2} - \phi\theta z_s^{-3}$ when said decoder control signal is in said second decoding control state, where $z_n^{31\ 1}$, $z_n^{-3}$, and $z_{n-4}$ represent delays of one, three, and four sampling periods of said normal desampling pulses, respectively, $z_s^{-1}$, $z_s^{-2}$, and $z_s^{-3}$ represent delays of one, two, and three sampling periods of said sub-Nyquist desampling pulses, respectively, $\phi$ represents a first factor between zero and unity, inclusive, and $\theta$ represents a second factor greater than zero and not greater than unity.

35. A predictive code communication system as claimed in claim 32, wherein said predictive decoding means comprises;
a first predictive filter having said first transfer function $P_1$ and responsive to first filter input signals for producing first filter output signals, first adder means supplied with first adder input signals and said first filter output signals for producing said reproduced samples, and means for supplying said reproduced samples to said first predictive filter as said first filter input signals;

a second predictive filter having a third transfer function $P_3$ and responsive to second filter input signals for producing second filter output signals, second adder means for adding second adder input signals and said second filter output signals to produce said first adder input signals, and means for supplying said first adder input signals to said second predictive filter as said second filter input signals; and a third predictive filter having a fourth transfer function $P_4$ and responsive to third filter input signals for producing third filter output signals, third adder means for adding said reproduced prediction error signals and said third filter output signals to produce said second adder input signals, and means for supplying said second adder input signals to said third predictive filter as said third filter input signals;

said second difference being equal to a product of a third difference $1 - P_3$ (one minus said third transfer function) and a fourth difference $1 - P_4$ (one minus said fourth transfer function); said decoding switch means being operatively coupled to first adder means and making said first adder means produce said first adder input signals plus said first filter output signals as said reproduce samples after lapse of said only one frame period while making said first adder means produce said first adder input signals alone as said reproduced samples during said only one frame period.

36. A predictive code communication system as claimed in claim 35, wherein said decoding switch means is operatively coupled further to one of said second and third predictive filters to render that one of said third and fourth transfer functions $P_3$ and $P_4$ which said one predictive filter has equal to $\phi z_n^{-1} + \theta z_n^{-3} - \phi\theta z_n^{-4}$ when said decoder control signal is in said first decoding control state and equal to $\phi z_s^{-1} + \theta z_s^{-2} - \phi\theta z_s^{-3}$ when said decoder control signal is in said second decoding control state, the other of said third and fourth transfer functions $P_3$ and $P_4$ being equal to $(z^{-H} - \phi z^{-H} - 100\, z^{-2H})$, where $z^{-H}$ and $z^{-2H}$ represent delays of one and two line periods, respectively, $z_n^{-1}$, $z_n^{-3}$, and $z_n^{-4}$ represent delays of one, three, and four sampling periods of said normal desampling pulses, respectively, $z_s^{-1}$, $z_s^{-2}$, and $z_s^{-3}$ represent delays of one, two, and three sampling periods of said sub-Nyquist desampling pulses, respectively, $\phi$ represents a first factor between zero and unity, inclusive, and $\theta$ represents a second factor greater than zero and not greater than unity.

* * * * *

UNITED STATES PATENT AND TRADEMARK OFFICE
CERTIFICATE OF CORRECTION

PATENT NO. : 4,075,655            Page 1 of 5
DATED : February 21, 1978
INVENTOR(S) : Yukihiko IIJIMA et al It is certified that error appears in the above-identified patent and that said Letters Patent are hereby corrected as shown below:

Column 1, line 35 - delete "NTSO" insert -- NTSC --

Column 3, line 16 - after "FIG. 7" insert -- is a -- line 61 - delete "Ti"

Column 4, line 4 - delete " = " (second occurrence) insert -- + --

Column 5, line 28 - delete "$E_2(z)$" " insert -- $E_2(z) =$ --

Column 6, line 41 - delete "dictifon" insert -diction --

Column 7, line 42 - delete "$\tilde{x}(z)$" insert -- $\tilde{X}(z)$ --

UNITED STATES PATENT AND TRADEMARK OFFICE
CERTIFICATE OF CORRECTION

PATENT NO. : 4,075,655
DATED : February 21, 1978
INVENTOR(S) : Yushihiko IIJIMA et al It is certified that error appears in the above-identified patent and that said Letters Patent are hereby corrected as shown below:

Column 7, line 42 - after "producing" insert -- a reproduction --

Column 9, line 59 - delete "$2^{-K}$" insert -- $2^{-k}$ --

Column 10, line 11 - after "Denso-hosiki" delete quotes line 12 - after "(HO-DPCM))" insert quotes

IN THE CLAIMS:

Column 17, line 1 - delete "a" (first occurrence) insert -- A --

UNITED STATES PATENT AND TRADEMARK OFFICE
CERTIFICATE OF CORRECTION

PATENT NO. : 4,075,655

DATED : February 21, 1978

INVENTOR(S) : Yukihiko IIJIMA et al

It is certified that error appears in the above-identified patent and that said Letters Patent are hereby corrected as shown below:

Column 17, line 34 - after "producing" insert -- reproduced -- line 61 - after "being" delete "a"

Column 18, line 37 - delete " $\emptyset z^{-3}$ " insert -- $\emptyset z^{-1}$ --

Column 19, line 9 - delete " $z^{31}$ H" insert -- $z^{-H}$ --

Column 20, line 13 - delete "$z^F$" insert -- $z^{-F}$ --

Column 24, line 11 - delete "$\theta z_n^{+3}$" insert -- $\theta z_n^{-3}$ -- lines 12-13 - delete "$+\theta z_s^{-2} - \emptyset\theta z_s^{-3}$" insert -- $+\theta z_s^{-2} - \emptyset\theta z_s^{-3}$ --

UNITED STATES PATENT AND TRADEMARK OFFICE
CERTIFICATE OF CORRECTION

PATENT NO. : 4,075,655
DATED : February 21, 1978
INVENTOR(S) : Yukihiko IIJIMA et al It is certified that error appears in the above-identified patent and that said Letters Patent are hereby corrected as shown below:

Column 25, line 19 - delete "PHd 4" insert -- $P_4$ -- line 21 - delete "$\emptyset 74z_n^{-4}$" insert -- $\emptyset \theta z_n^{-4}$ -- line 22 - delete "$\theta z_s^{31}\ ^2$" insert -- $\theta z_s^{-2}$ -- line 25 - delete "$(z^{32}H = \emptyset z^{-H} = 0z^{-H}$" insert --$(z^{-H} - \emptyset z^{-H} - \emptyset z^{-2}H)$ -- line 35 - before "predictive" insert -- A --

Column 26, line 50 - delete "$\theta_{n-3}$" insert -- $\theta z_n^{-3}$ -- line 52 - delete "$\emptyset z_{s-1}$" insert -- $\emptyset z_s^{-1}$ --

UNITED STATES PATENT AND TRADEMARK OFFICE
CERTIFICATE OF CORRECTION

PATENT NO. : 4,075,655
DATED : February 21, 1978
INVENTOR(S) : Yukihiko IIJIMA et al It is certified that error appears in the above-identified patent and that said Letters Patent are hereby corrected as shown below:

Column 26, line 54 - delete " $z_n^{31\,1}$, $z_n^{-3}$, and $z_{n-4}$ "
 insert -- $z_n^{-1}$, $z_n^{-3}$, and $z_n^{-4}$ --

Column 28, line 1 - delete "reproduce" insert -- reproduced -- lines 11-12 - delete " $\emptyset z_n^{-1} + \theta z_n^{-3}\,i\,31\ \emptyset\theta z_n^{-4}$ "
 insert -- $\emptyset z_n^{-1} + \theta z_n^{-3} - \emptyset\theta z_n^{-4}$ -- line 18 - delete " $100_z^{-2H}$ " insert -- $\emptyset z^{-2H}$ --

Signed and Sealed this

Seventh Day of November 1978

[SEAL]

Attest:

RUTH C. MASON
Attesting Officer

DONALD W. BANNER
Commissioner of Patents and Trademarks